United States Patent [19]

Komiya et al.

[11] 4,422,751
[45] Dec. 27, 1983

[54] ORIGINAL FEED CONTROL UNIT

[75] Inventors: Yutaka Komiya; Koichi Takada, both of Tokyo, Japan

[73] Assignee: Canon Kabushiki Kaisha, Tokyo, Japan

[21] Appl. No.: 366,576

[22] Filed: Apr. 8, 1982

[30] Foreign Application Priority Data

| Apr. 15, 1981 | [JP] | Japan | 56/55524 |
| Apr. 16, 1981 | [JP] | Japan | 56/56214 |
| Apr. 20, 1981 | [JP] | Japan | 56/58586 |

[51] Int. Cl.³ .................................................. G03G 15/00
[52] U.S. Cl. ........................... 355/14 SH; 355/3 SH; 355/7; 355/24; 271/3.1; 271/110; 271/124
[58] Field of Search ............ 355/3 SH, 14 SH, 3 R, 355/14 R, 7, 23, 24; 271/3.1, 4, 110, 124, 229, 243, 244

[56] References Cited

U.S. PATENT DOCUMENTS

| 3,897,053 | 7/1975 | Guy ........................... 271/243 X |
| 3,948,510 | 4/1976 | Iwamoto et al. ............. 271/110 X |
| 4,078,787 | 3/1978 | Burlew et al. ............... 271/3.1 |
| 4,082,595 | 4/1978 | Slater ......................... 271/110 X |
| 4,179,215 | 12/1979 | Hage ......................... 271/4 X |
| 4,268,164 | 5/1981 | Yajima et al. .............. 355/7 X |
| 4,335,954 | 6/1982 | Phelps ....................... 355/14 SH |

Primary Examiner—A. C. Prescott
Attorney, Agent, or Firm—Fitzpatrick, Cella, Harper & Scinto

[57] ABSTRACT

An original feed control unit for a copying machine has programming means for variably setting a stop position of an original fed by an original feed device prior to the start of the copy operation. By varying the stop position, the size of the margin formed on the copy paper can be varied. The position of a detector for detecting a jam of the original may be also varied in accordance with the desired size of the margin in order to properly detect a jam.

11 Claims, 7 Drawing Figures

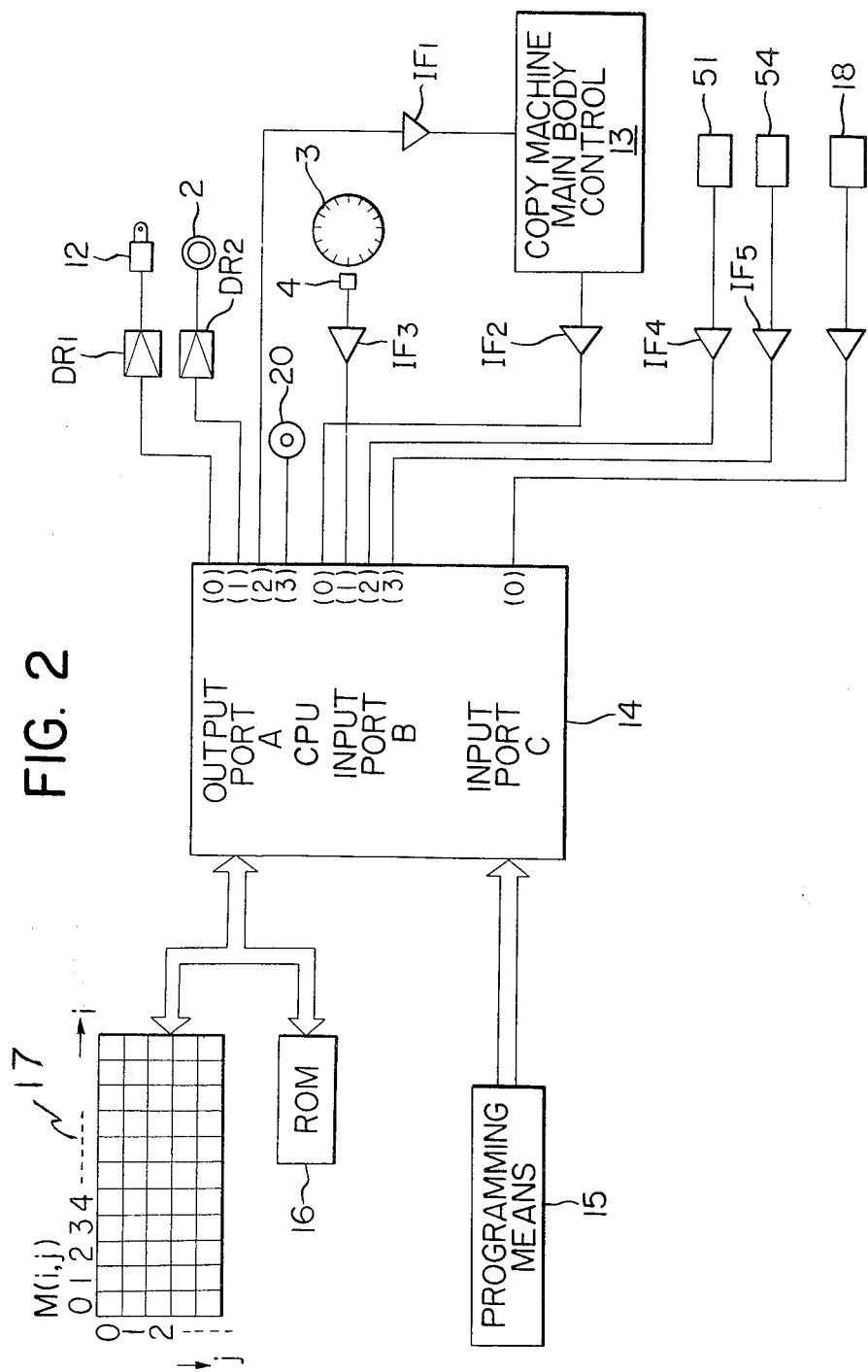

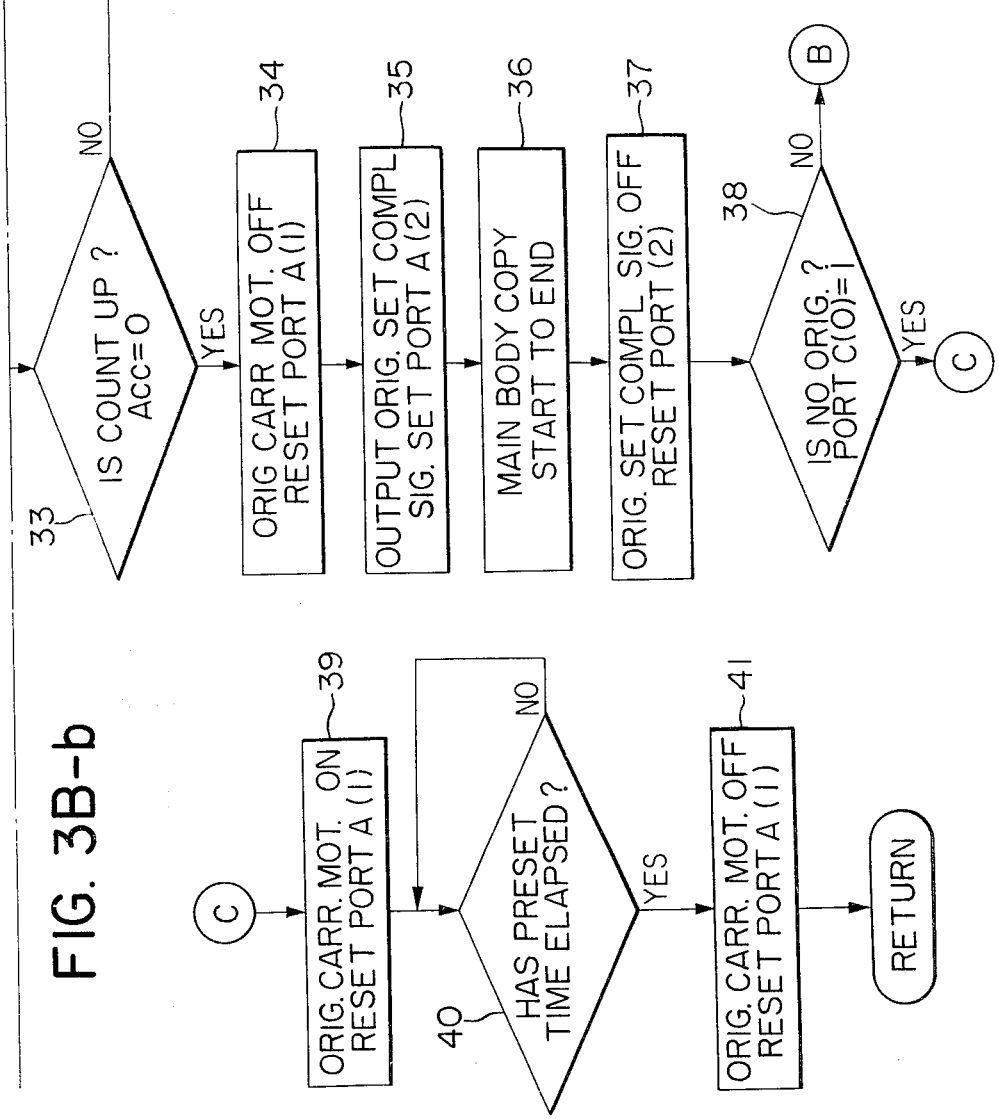

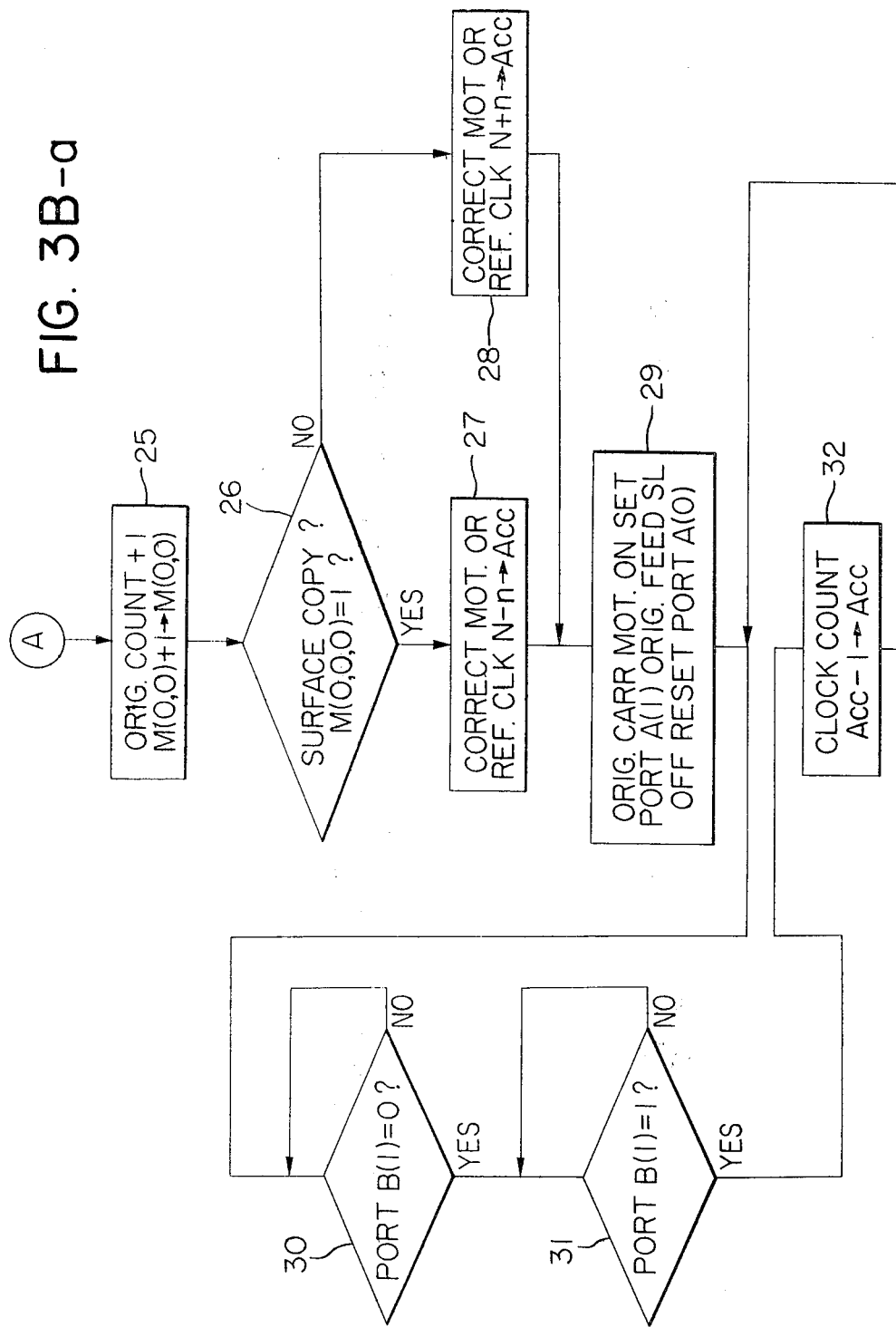
FIG. 3B-a

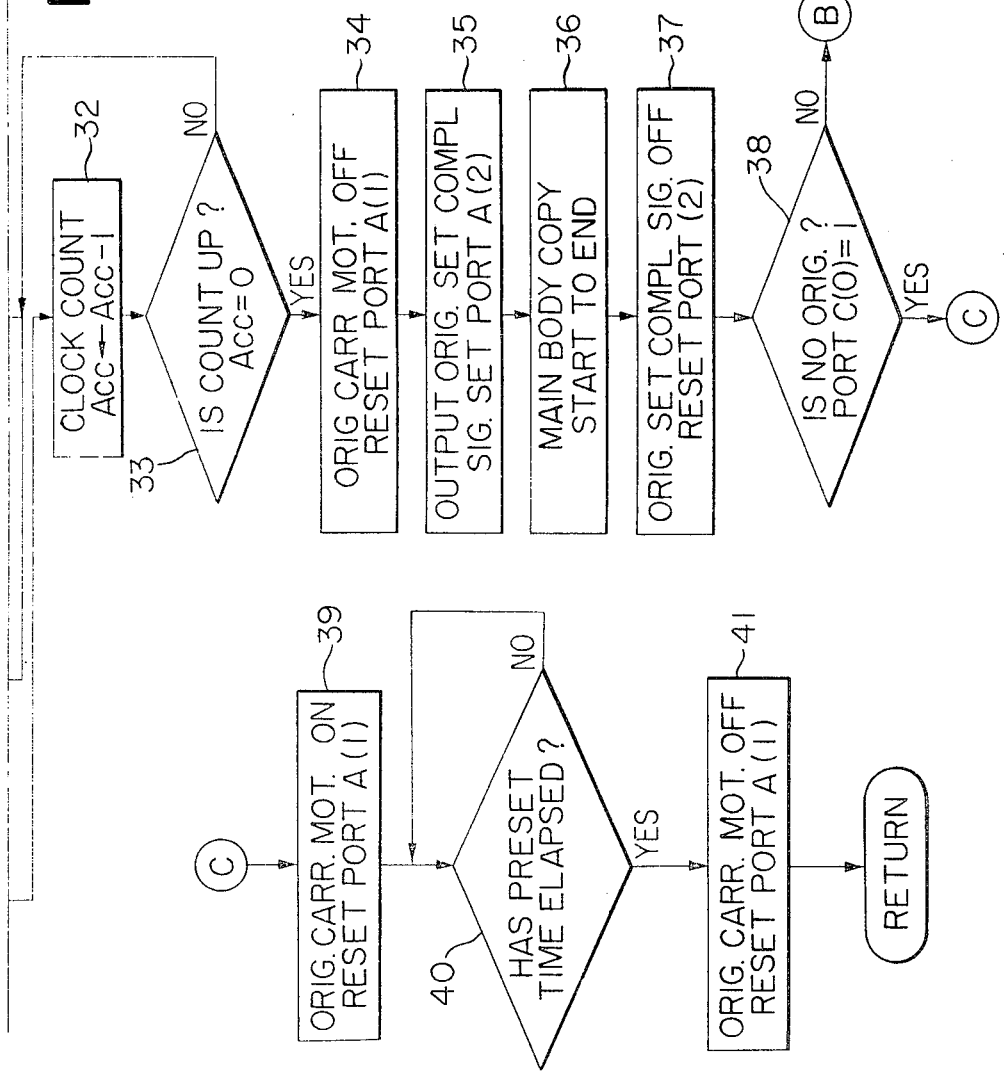

FIG. 5B-a
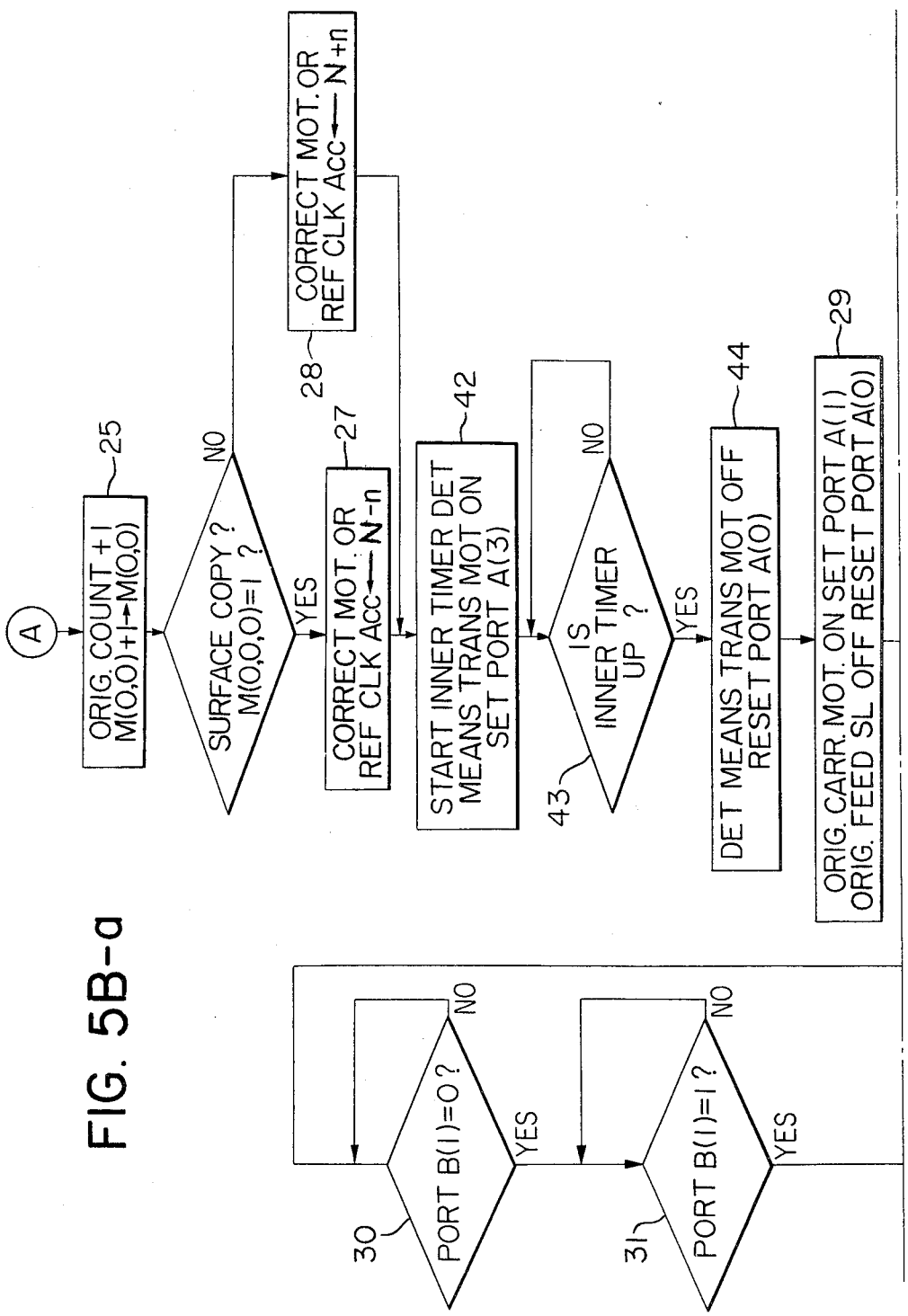

ORIGINAL FEED CONTROL UNIT

BACKGROUND OF THE INVENTION

1. Field of the Invention

The present invention relates to an original feed control unit for feeding an original to a predetermined position, which is used in association with an image forming apparatus such as copying machine or printer.

2. Description of the Prior Art

A double side copying machine capable of forming copies on both sides of a copying paper has been known. In such a double side copying machine, an original feed device for feeding an original to a predetermined position may be associated therewith to feed the original. When it is desired to form copies on both sides of the copying paper while leaving margins on both sides, different controls are required to leave the margins at the same position on the front side and the back side.

In the prior art, when the margin is to be left on the copying paper, a control unit in the copying machine shifts an image formation start time from a copy paper feed and transfer time to produce a desired margin. Such a prior art method is complex to control and increases cost of a circuit and a program. In addition, because of complexity of the apparatus, trouble frequently occurs and hence a reliability is low.

SUMMARY OF THE INVENTION

It is an object of the present invention to provide an original feed control unit which permits a desired margin to be left on a copy paper with a simple construction.

It is another object of the present invention to provide an original feed control unit which controls an original detection position in accordance with a margin to be formed.

The above and other objects of the present invention will be apparent from the following description of the present invention.

BRIEF DESCRIPTION OF THE DRAWINGS

FIG. 2 shows a block diagram of a control unit of the original feed device shown in FIG. 1, FIGS. 3A and 3B show flow charts for the control for forming a margin, FIGS. 5A and 5B show flow charts for the control for forming the margin and moving the original detecting means.

DETAILED DESCRIPTION OF THE PREFERRED EMBODIMENTS

Figure 1:
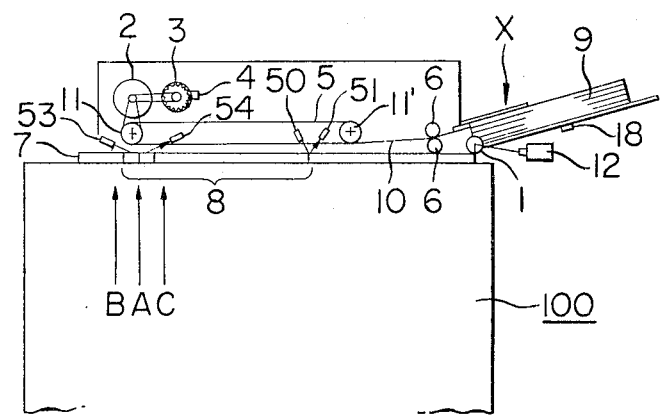
FIG. 1 shows a schematic structure of an original feed device.

FIG. 1 shows a schematic structure of an original feed device loaded in a copying machine. Numeral 100 denotes the copying machine, X denotes an original loader, and numeral 1 denotes an original feed roll which is driven by original feed solenoid 12 to feed a bottommost one of an original stack 9 stacked on an original tray, to a feed roll 6. The solenoid 12 is driven when the copying machine issues an original feed instruction so that one of the originals 9 is fed into the original feed device. The original 9 thus fed is further fed by the feed roll 6 to an end of a conveyer belt 5 which is wound around rolls 11 and 11' and driven by a drive motor 2 when the original feed instruction is issued. A timing disk 3 is coupled to the motor 2 so that the timing disk 3 is rotated with the rotation of the motor 2. The rotation of the timing disk 3 is detected by a detector 4 comprising a photo-interrupter for converting an optical signal to an electrical signal, in order to detect the actuation time of the motor 2. Numeral 7 denotes a base plate which defines an original feed plane and numeral 10 denotes a guide for the original. Numeral 18 denotes a sensor for detecting presence or absence of the original in the original loader X. It may comprises a microswitch or a photo-sensor. Numerals 50, 51 and 53, 54 denote original detecting means for detecting the original passing through the base plate. In the present embodiment, they are optical detecting means comprising light emitting devices 50 and 53 and photo-sensing devices 51 and 54 for detecting lights emitted from the light emitting devices 50 and 53 and reflected by the original. The detecting positions of the detecting means are variable in accordance with the position of the margin to be formed, as will be explained later.

FIG. 2 shows a block diagram of the control unit of the original feed device shown in FIG. 3. The like reference numerals to those of FIG. 1 denote the like elements.

In FIG. 2, a CPU (central processing unit) 14 is connected with programming means 15 to specify a margin on the copy paper, as will be explained later. A ROM 16 and a RAM 17 are connected to the CPU 14. A program stored in the ROM 16 controls an overall operation and causes necessary data to be stored in the RAM 17. The RAM 17 has memory areas arranged in i and j coordinates with each memory area M (i, j) consisting of four bits. Hereinafter, the n-th bit of the four bits is expressed by M(i, j, n). The CPU 14 has input ports A and output ports B. A port A (0) is connected to the solenoid 12 through a driver $DR_1$, a port A (1) is connected to the motor 2 through a driver $DR_2$, and a port A (2) is connected to a control unit 13 of the copying machine through an interface $IF_1$. An output signal from the control unit 13 of the copying machine is supplied to a port B (0) through an interface $IF_2$, and the signal from the timing disk 3 detected by the detector 4 is supplied to a port B (1) through an interface $IF_3$.

The output signals from the photo-sensing devices 51 and 54 are supplied to the input pots B (2) and B (3) through interfaces $IF_4$ and $IF_5$, respectively. The output signal from the original sensor 18 is supplied to an input port C (0) through an interface $IF_6$.

In the original feed device thus constructed, when an original feed instruction is issued from the control unit 13 of the copying machine to the input port B (0) of the CPU 14, the solenoid drive signal is generated at the output port A (0) to energize the solenoid 12. As a result, one of the originals 9 is fed to the original feed plane by the roll 1. The original 9 fed to the original feed plane is then fed by the feed roll 6 to the end of the conveyer belt 5 wound around the rolls 11 and 11' which are driven by the drive motor 2. If the margin is not required, the drive motor 2 is driven for a time period corresponding to N clock periods 8 so that the original 9 is fed to a position A and stops there. If the copy operation is started from this condition, an edge of the copy paper and an edge of the original are aligned and a normal copy is formed.

If a margin corresponding to n clock periods is required, the programing means 15 supplies to CPU 14 data for actuating the drive motor 2 for N±n clock periods instead of N clock periods depending on whether the margin is formed on the right side or the left side. The number n can be variably set by a ten-key or levers (not shown) arranged on the programming means 15. For example, in a front copy cycle of the double side copying machine, the drive motor 2 is actuated for N−n clock periods. In this case, the original feed device is controlled to feed the original to a point C before the point A in FIG. 1 and stop the original there. As a result, a wider margin is formed on the left side edge of the copy paper. In a rear copy cycle, the drive motor 2 is actuated for N+n clock periods. In this case, the original is fed to a point B past the point A and stops there. As a result, a wider margin is formed on the right side edge of the copy paper. In this manner, according to the present embodiment, the margin of any desired width can be formed in the front copy cycle and the rear copy cycle and the formation of the margin can be controlled independently of the control for the copying machine. The number n may be selected from predetermined numbers by keys.

Figure 3A:
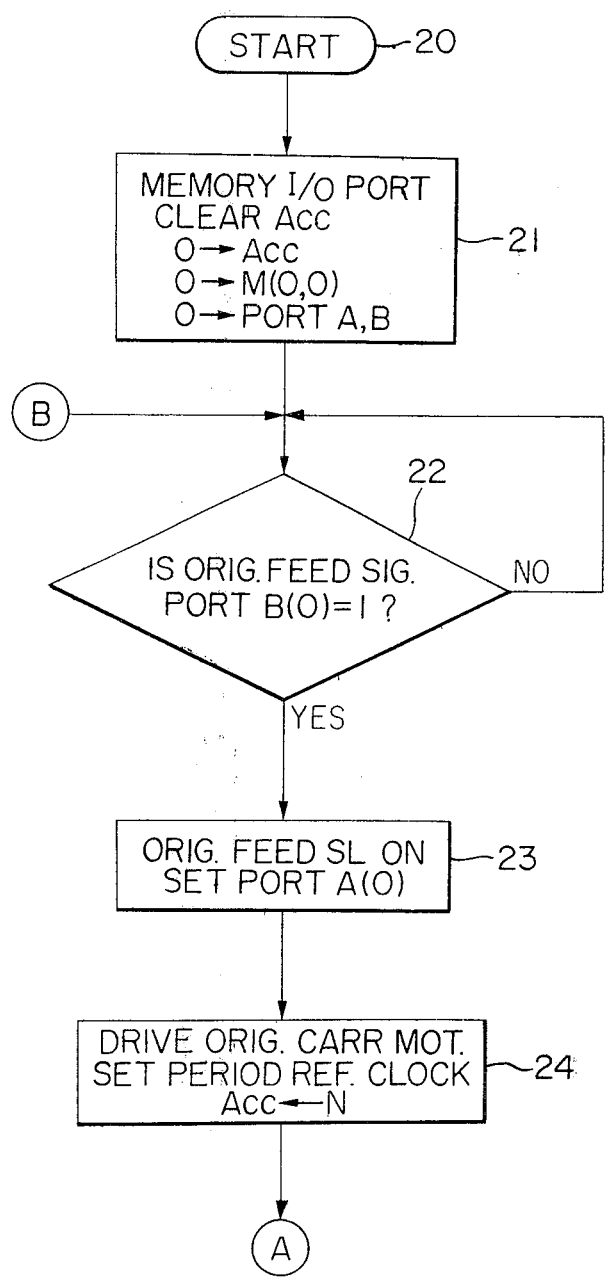

FIGS. 3a and 3B show flow charts for the control for forming the margin. In a step 21, the memory 17, the I/O ports A and B and an accumulator ACC in the CPU 14 are cleared. In a step 22, the signal level at the port B (O) is sensed to determine if the original feed signal is present or not. If the original feed signal has been issued by the control unit 13 of the copying machine, the port A (O) is set and the original feed solenoid (SL) 12 is energized in a step 23. In a step 24, a reference number of clocks indicating the actuation period of the original feed motor is set to the accumulator ACC. For example, if the number is N, the motor 2 is actuated for the period to feed the original to the position A. If the copy operation is started from this condition, the edge of the copy paper and the edge of the original are aligned and the copy with a normal margin is formed.

As shown in FIG. 3B, a content of an original counter defined at an area M (O, O) of the RAM 17 is incremented by one in a step 25, and a front side copy or rear side copy is checked in a step 26. This is determined by checking the 0-bit of the memory area M (O, O), or M (O, O, O). When an odd number original is fed, the content of the memory area M (O, O) which is the original counter is odd and hence M (O, O, O) is "1". When an even number original is fed, the content of the memory area M (O, O) is even and hence M (O, O, O) is "0". Accordingly, when M (O, O, O) is "1", the front side copy cycle is detected and when M (O, O, O) is "0" the back side copy cycle is detected. If the front side copy is detected, the reference number of clocks for actuating the motor 2 is corrected to N−n in a step 27 and the corrected number N−n is set to the accumulator ACC. If the back side copy is detected, the content of the accumulator ACC is corrected to N+n in a step 28. In the front side copy cycle, the actuation period of the motor 2 is short and original is fed to the position C shown in FIG. 1. As a result, a wider margin is formed. In the back side copy cycle, the actuation period of the motor 2 is long and the original is fed to the position B. As a result, a narrower margin than usual is formed. In a step 29, the port A (1) is set to actuate the original feed motor 2 and the port A (0) is reset to deenergize the original feed solenoid 12. In steps 30 and 31, the level at the port B (1) is checked. Thus, the rotation position of the motor 2 is detected and the content of the accumulator ACC is decremented by one for each detection of the pulse (step 32) and the motor 2 is rotated until the content of the accumulator ACC reaches zero (step 33). When it reaches zero, that is, after the motor 2 has been actuated for the predetermined period, the port A (1) is reset and the orriginal feed motor 2 is deactuated (step 34). Then, the port A (2) is set to produce an original set completion signal (step 35). In a step 36, the copying machine starts the copy operation. When the desired number of copies have been produced, the port A (2) is reset to turn off the original set completion signal (step 37), and the output of the original sensor 18 is checked to determine whether the original to be fed is in the original loader X (step 38). If the port C (0) is not "1", it is determined that the original to be fed is in the original loader X and the process goes back to the step 23 to feed the next original. The original on the exposure station is ejected when the next original is fed. If the port C (0) is "1", it is determined that the original to be fed is not in the original loader X and the original feed motor 2 is driven for a predetermined time period to eject the original on the exposure station (steps 37–41).

In this manner, when the margin corresponding to the n clock periods is to be formed in the front side copy cycle or the back side copy cycle, the content of the accumulator is corrected to N±n by the programming means 15 shown in FIG. 2 and the corrected content is sent to the CPU 14. As a result, the original is fed to the point B or C. Then, the copying machine starts the copy operation to copy the original to the copy paper from the predetermined position so that desired margin is formed on the copy paper.

When the feed of the original is controlled in this manner, a jam must be detected at a different timing from that of a normal copy operation in which additional margin is not formed.

Referring to FIG. 1, in a normal copy mode for forming a normal margin, the original must have reached the point A when the original feed motor 2 stopped and the original setting completed. Accordingly, the detecting means 50 and 51 must detect the absence of the original and the detecting means 53 and 54 must detect the presence of the original. However, if the wider margin is to be formed on the right side or the left side of the copy paper, the leading edge of the copy paper is not at the normal position for the normal margin. Accordingly, the jam cannot be detected at those detecting positions. In this case, the detecting means are moved by moving means shown in FIG. 4.

Figure 4:
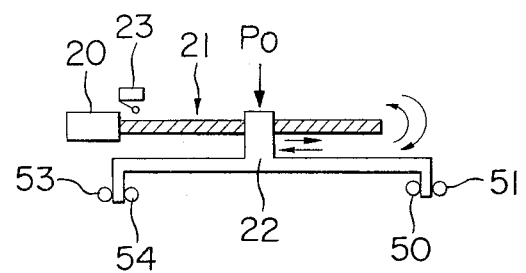
FIG. 4 shows a schematic structure of a mechanism for moving original detecting means.

Referring to FIG. 4, numeral 20 denotes a detector moving motor, numeral 31 denotes a screw directly coupled to an output shaft of the motor 20 and numeral 22 denotes a mounting member fitted to the screw 21 and mounting the detecting means 50, 51 and 53, 54 thereon. As the motor 20 rotates, the mounting member is moved to the left and right with reference to a zero margin position Po. When the CPU 14 shown in FIG. 2 reads in the margin data, the CPU 14 supplies a control signal for the motor 20 to the output port A (3). Usually, this time period is set by a software timer or an internal timer. The mounting member 22 shown in FIG. 4 is normally positioned at the position of a detector 23 which detects a predetermined position and it is moved to the position corresponding to the specified margin by the motor 20. Since the detecting means are movable, the jam in the original feed device can be detected for any margin size.

Figure 5A:
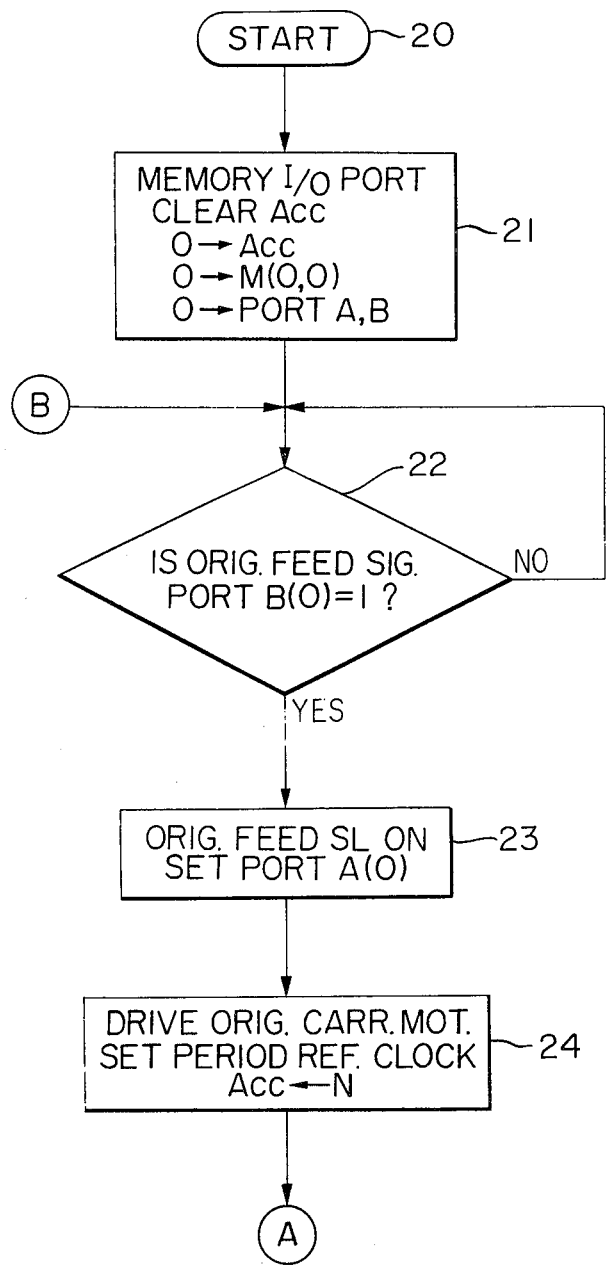

FIGS. 5A and 5B show flow chart for the above process. Steps 21-41 are identical to those of FIGS. 3A and 3B and hence they are not explained here.

After the step 27 or 28, the internal timer is started, the output port A (3) of the CPU 14 is set and the detector moving motor 20 is actuated in a step 42, and the time-up of the internal timer is checked in a step 43. If it has been timed up, the detector moving motor 20 is deactuated and the output port A (3) of the CPU 14 is reset in a step 44. The process then proceeds to the step 29 to feed the original. The timer period of the internal timer varies with the value n.

As described above, according to the present invention, in the original feed device which can form any size of margin on the copy paper, at least one original detecting means is arranged at the predetermined position on the path of the original to detect the jam by the output signal from the original detecting means and means for moving the original detecting means in accordance with the size of the margin on the copy paper. Accordingly, the jam can be positively detected by merely adding the control unit of inexpensive and simple circuit construction to the original feed device independently of the control unit of the copying machine. Instead of moving the detecting means, the detection timing of the detecting means may be controlled.

What we claim is:

1. An original feed control unit comprising:
   comveying means for conveying an original to an exposure station of an image forming apparatus;
   input means for entering a desired width of a margin to be formed on a recording material, the width variable; and
   control means for controlling a stop position of said original conveyed by said conveying means in accordance with an image forming mode of said image forming apparatus to provide the width of the margin entered from said input means.

2. An original feed control unit according to claim 1 wherein said image forming apparatus is capable of forming images on both sides of a recording medium and said control means controls said stop position in accordance with a front side mode for forming the image on a front side and a back side mode for forming the image on a back side.

3. An original feed control unit according to claim 2 wherein said control means determines said front side mode and said back side mode by the order of the original conveyed for controlling the actuation time of said conveying means.

4. An original feed control unit according to claim 3 wherein said control means sets a longer actuation time when said order is an odd number.

5. An original feed control control unit according to claim 3 or 4 wherein said control means sets a shorter actuation time when said order is an even number.

6. An original feed control unit comprising:
   conveying means for conveying an original;
   detecting means for detecting abnormal feed state of said original conveyed by said conveying means;
   control means for controlling a stop position of said conveying means; and
   setting means for setting a detection condition of said detecting means in accordance with said stop position.

7. An original feed control unit according to claim 6 wherein said control means controls said stop position in accordance with the order of the original conveyed.

8. An original feed control unit according to claim 6 wherein said detecting means detects a jam of said original.

9. An original feed control unit according to claim 7 wherein said control means adjusts the actuation time of said conveying means in accordance with an odd number or an even number of said order to control said stop position.

10. An original feed control unit according to claim 6 wherein said detection condition is determined by a position of said detecting means and said setting means moves the position of said detecting means.

11. An original feed control unit according to claim 10 wherein said setting means includes a drive motor, a screw directly coupled to an output shaft of said drive motor and a mounting member fitted to said screw for mounting said detecting means thereon.

* * * * *

UNITED STATES PATENT AND TRADEMARK OFFICE
CERTIFICATE OF CORRECTION

PATENT NO. : 4,422,751

DATED : December 27, 1983

INVENTOR(S) : YUTAKA KOMIYA, ET AL.

It is certified that error appears in the above-identified patent and that said Letters Patent is hereby corrected as shown below:

```
Column 1, line  9, insert --a-- before "copying";
          line 12, change "has been" to --is--;
          line 21, change "the" (second occurrence) to --a--;
          line 26, insert --the-- before "cost";
          line 27, insert --the-- before "complexity";
          line 28, delete "a" before "reliability";
          line 47, change "and 3B show" to --, 3B-a and 3B-b
                    are--;
          line 49, delete "a schematic structure of";
          line 50, insert --an-- before "original";
          line 51, change "and 5B show" to --, 5B-a and 5B-b
                    are--;
          line 62, change "an original stack" to --a stack of
                    originals--;
          line 67, change "roll" to --rolls--.

Column 2, line 10, insert --the-- before "presence";
          line 12, change "comprises" to --comprise--;
          line 15, change "they are" to --the detecting means
                    is an--;
          line 17, change "lights" to --light--;
          line 25, change "The like" to --Like--;
          line 26, delete "the";
          line 37, change "A" to --B--;
          line 38, change "B" to --A--;
          line 55, change "the" (first occurrence) to --a--;
          line 60, change "roll" to --rolls--;
          line 61, change "converyer" to --conveyor--.
          line 25, change "Fig. 3." to -- Fig. 1. --.
```

UNITED STATES PATENT AND TRADEMARK OFFICE
CERTIFICATE OF CORRECTION

PATENT NO. : 4,422,751
DATED : December 27, 1983
INVENTOR(S) : YUTAKA KOMIYA, ET AL.

It is certified that error appears in the above-identified patent and that said Letters Patent is hereby corrected as shown below:

Column 3, line 1, change "n" to --N'--;
        line 25, change "and 3B show" to --, 3B-a and 3B-b are--;
        line 26, delete "a"; "memory" should read --RAM--;
        line 28, delete "a";
        line 33, delete "a" (first and second occurrences);
        line 40, delete "the" (second occurrence);
        line 44, delete "a" (first occurrence);
        line 45, delete "a";
        line 56, delete "a";
        line 59, delete "a";
        line 66, delete "a".

Column 4, line 10, delete "a" (first occurrence);
        line 15, change "the" to --an--;
        line 24, change "(steps 37-41)" to --(steps 39-41)--;
        line 26, change "n" to --N'--;
        line 54, change "numeral 31" to --numeral 21--.

Column 5, line 3, "and 5B show" should read --, 5B-a and 5B-b are--;
        line 15, insert --one embodiment of-- after "to";
        lines 19 - 20, delete "by the output signal from the original detecting means"; insert --there is-- after "and";
        line 24, change "the" to --a--.
        line 31, "comveying" should read --conveying--;
        line 35, insert --being-- before "variable".

UNITED STATES PATENT AND TRADEMARK OFFICE
CERTIFICATE OF CORRECTION

PATENT NO. : 4,422,751  Page 3 of 3
DATED : December 27, 1983
INVENTOR(S) : YUTAKA KOMIYA, ET AL.

It is certified that error appears in the above-identified patent and that said Letters Patent is hereby corrected as shown below:

Column 6, line 6, Claim 3, change "by the" to --from the feed--;
line 11, Claim 4, insert --feed-- before "order";
line 17, Claim 6, insert --an-- before "abnormal";
line 26, Claim 7, insert --feed-- before "order";
lines 32-33, Claim 9, delete "an odd number or an even number of";
line 33, change "said" to --the feed--;
lines 35-38, Claim 10, should read:

--An original feed control unit according to Claim 6 wherein said setting means moves the position of said detecting means and said detection condition is determined by said position of said detecting means.--

Signed and Sealed this

Eighteenth Day of September 1984

[SEAL]

Attest:

GERALD J. MOSSINGHOFF

Attesting Officer

Commissioner of Patents and Trademarks